US012322250B2

(12) United States Patent
Lai et al.

(10) Patent No.: US 12,322,250 B2
(45) **Date of Patent: *Jun. 3, 2025**

(54) GAMING BENEFITS PROVIDED IN ASSOCIATION WITH ACCUMULATED ADVERTISING LOYALTY POINTS

(71) Applicant: IGT, Las Vegas, NV (US)

(72) Inventors: Vincent S. Lai, Las Vegas, NV (US); Patrick Danielson, Las Vegas, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/116,192

(22) Filed: Mar. 1, 2023

(65) Prior Publication Data

US 2023/0206723 A1 Jun. 29, 2023

Related U.S. Application Data

(63) Continuation of application No. 16/810,410, filed on Mar. 5, 2020, now Pat. No. 11,636,734.

(51) Int. Cl.
*G07F 17/32* (2006.01)

(52) U.S. Cl.
CPC ................................ *G07F 17/3255* (2013.01)

(58) Field of Classification Search
CPC .............. G07F 17/323; G07F 17/3255; G06Q 30/0233
See application file for complete search history.

(56) References Cited

U.S. PATENT DOCUMENTS

| | | | |
|---|---|---|---|
| 6,390,917 B1 | 5/2002 | Walker et al. | |
| 7,485,040 B2 | 2/2009 | Walker et al. | |
| 7,946,922 B2 | 5/2011 | Yin | |
| 7,997,978 B2 | 8/2011 | Kaminkow et al. | |
| 8,262,469 B2 | 9/2012 | Iddings et al. | |
| 8,366,544 B2 | 2/2013 | Walker et al. | |
| 8,403,760 B2 | 3/2013 | Yin | |
| 8,715,077 B2 | 5/2014 | Paradise et al. | |
| 8,777,733 B2 | 7/2014 | Baerlocher et al. | |
| 9,105,150 B2 | 8/2015 | Nguyen et al. | |
| 9,430,907 B2 | 8/2016 | Vann | |
| 10,249,137 B2 | 4/2019 | Washington et al. | |
| 2006/0073885 A1 | 4/2006 | Rowe et al. | |
| 2006/0105837 A1 | 5/2006 | Walker et al. | |
| 2007/0077981 A1 | 4/2007 | Hungate et al. | |
| 2007/0105613 A1 | 5/2007 | Adams et al. | |
| 2008/0004097 A1 | 1/2008 | Maya et al. | |
| 2009/0117989 A1 | 5/2009 | Arezina et al. | |
| 2010/0228613 A1* | 9/2010 | Anderson | G06Q 30/02 705/14.13 |
| 2012/0157189 A1 | 6/2012 | Hungate | |
| 2013/0029762 A1* | 1/2013 | Klappert | A63F 13/792 463/31 |
| 2013/0072288 A1 | 3/2013 | Thoeni et al. | |
| 2013/0102383 A1 | 4/2013 | Smith et al. | |
| 2014/0012652 A1 | 1/2014 | Levin et al. | |
| 2014/0278927 A1 | 9/2014 | Close et al. | |
| 2017/0169663 A1 | 6/2017 | Froy | |
| 2019/0228610 A1 | 7/2019 | Washington et al. | |

* cited by examiner

*Primary Examiner* — Robert E Mosser
(74) *Attorney, Agent, or Firm* — Neal, Gerber & Eisenberg LLP

(57) ABSTRACT

Systems and methods that employ advertising loyalty points to modify zero, one or more aspects of an electronic gaming machine.

12 Claims, 7 Drawing Sheets

GAMING BENEFITS PROVIDED IN ASSOCIATION WITH ACCUMULATED ADVERTISING LOYALTY POINTS

BACKGROUND

In various embodiments, the present disclosure pertains to the utilization of advertising loyalty points to determine one or more benefits in association with a gaming session.

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a gaming system including a processor, and a memory device that stores a plurality of instructions. When executed by the processor, the instructions cause the processor to identify a user and determine an advertising loyalty point level associated with the identified user. When executed by the processor responsive to the identified user being associated with a first advertising loyalty point level and a triggering event occurring, the instructions cause the processor to determine a first modification of a play of a game, and cause a display device to display the determined first modification of the play of the game. When executed by the processor responsive to the identified user being associated with a second, different advertising loyalty point level and the triggering event occurring, the instructions cause the processor to determine a second, different modification of the play of the game, and cause the display device to display the determined second, different modification of the play of the game.

In certain embodiments, the present disclosure relates a gaming system including a processor, and a memory device that stores a plurality of instructions. When executed by the processor, the instructions cause the processor to identify a user, determine an advertising loyalty point level associated with the identified user, and determine a quantity of accumulated advertising loyalty points associated with the identified user. When executed by the processor responsive to the determined advertising loyalty point level being a first advertising loyalty point level, the determined quantity of accumulated advertising loyalty points being a first quantity of accumulated advertising loyalty points and a triggering event occurring, the instructions cause the processor to determine a first benefit, and cause a display device to display the determined first benefit. When executed by the processor responsive to the determined advertising loyalty point level being the first advertising loyalty point level, the determined quantity of accumulated advertising loyalty points being a second, different quantity of accumulated advertising loyalty points and the triggering event occurring, the instructions cause the processor to determine a second, different benefit, and cause the display device to display the determined second, different benefit. When executed by the processor responsive to the determined advertising loyalty point level being a second, different advertising loyalty point level, the determined quantity of accumulated advertising loyalty points being the first quantity of accumulated advertising loyalty points and the triggering event occurring, the instructions cause the processor to determine the second, different benefit, and cause the display device to display the determined second, different benefit.

In certain embodiments, the present disclosure relates to a method of operating a gaming system including identifying, by a processor, a user, and determining, by the processor, an advertising loyalty point level associated with the identified user. Responsive to the identified user being associated with a first advertising loyalty point level and a triggering event occurring, the method includes determining, by the processor, a first modification of a play of a game, and displaying, by a display device, the determined first modification of the play of the game. Responsive to the identified user being associated with a second, different advertising loyalty point level and the triggering event occurring, the method includes determining, by the processor, a second, different modification of the play of the game, and displaying, by the display device, the determined second, different modification of the play of the game.

Additional features are described herein, and will be apparent from the following Detailed Description and the figures.

DETAILED DESCRIPTION

In various embodiments, the systems and methods of the present disclosure provide a gaming currency in the form of advertising loyalty points which are in addition to and different than certain current known gaming establishment currencies, such as monetary credits, promotional credits and player tracking points. The advertising loyalty points of the present disclosure are accumulated based on a user undertaking certain advertiser related activities, such as viewing advertisements associated with the gaming establishment while remote from the gaming establishment. The advertising loyalty points of the present disclosure are further utilized to obtain one or more benefits at an electronic gaming machine ("EGM") wherein different quantities of accumulated advertising loyalty points are associated with different advertising loyalty point levels associated with different benefits, such as different modifications of the EGM. Accordingly, unlike certain gaming currencies which are accumulated based on a player's gaming activities at one or more EGMs, the advertising loyalty points of the present disclosure are accumulated independent of a player's gaming activities at any EGMs, thus freeing the player up from having to remain at a gaming establishment without forcing the player to forgo earning benefits to be subsequently used at the gaming establishment.

Figure 1A:
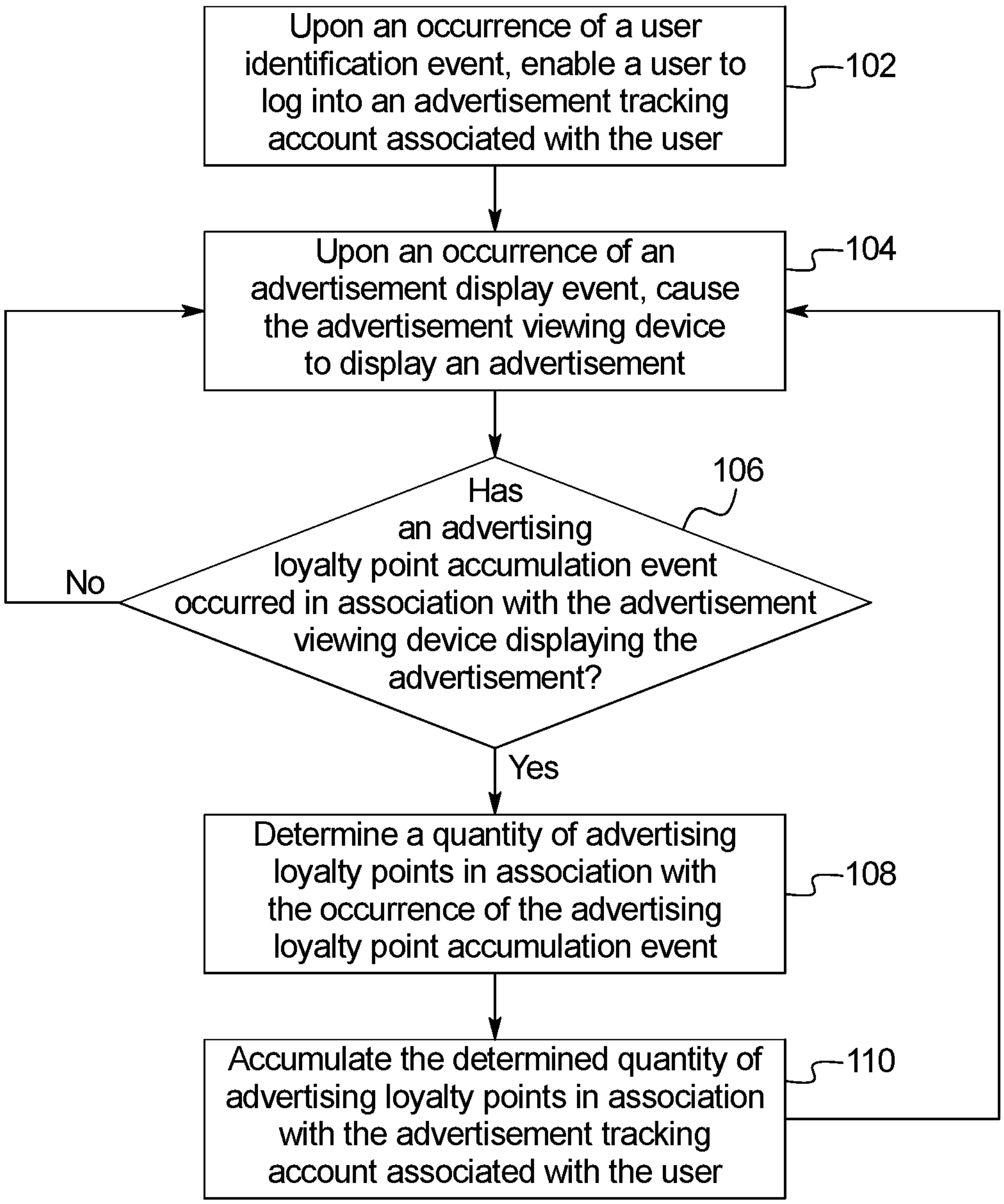
FIG. 1A is a flow chart of an example process of one embodiment of the present disclosure illustrating the accumulation of advertising loyalty points in association with a user undertaking certain advertiser related activities remote from a gaming establishment.
Figure 1B:
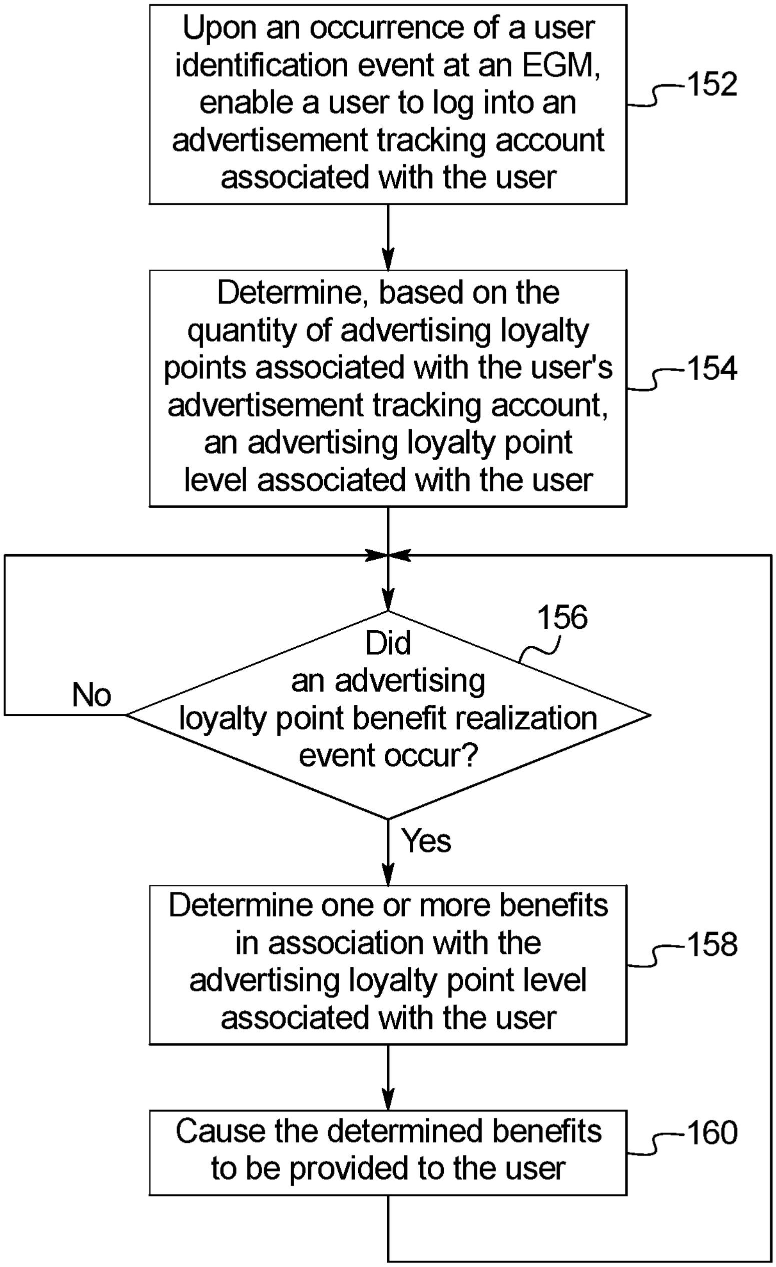
FIG. 1B is a flow chart of an example process of one embodiment of the present disclosure illustrating the utilization of a quantity of accumulated advertising loyalty points in association with a benefit provided to a user at a gaming establishment device.

FIGS. 1A and 1B are flowcharts of example processes or methods of operating the system of the present disclosure. In various embodiments, the processes are represented by a set of instructions stored in one or more memories and executed by one or more processors. Although the processes are described with reference to the flowchart shown in FIGS. 1A and 1B, many other processes of performing the acts associated with these illustrated processes may be employed. For example, the order of certain of the illustrated blocks or diamonds may be changed, certain of the illustrated blocks or diamonds may be optional, or certain of the illustrated blocks or diamonds may not be employed.

In certain embodiments, upon an occurrence of a user identification event, as indicated by block 102 of FIG. 1A, the system enables a user to log into an advertisement tracking account associated with the user. In these embodiments, to track the advertisements a user views and reward the user with advertising loyalty points, the system must first identify the user and the user's advertisement tracking account to which any earned advertising loyalty points are associated with.

In certain embodiments, wherein the user earns advertising loyalty points for viewing advertisements remote from an EGM of a gaming establishment and the system includes or is otherwise in communication with a gaming establishment player tracking system of a gaming establishment customer management system, the user identification occurs in association with a user logging into the player tracking system from a device remote from an EGM of a gaming establishment, such as a personal device (e.g., a smartphone, a tablet computer, a desktop computer, or a laptop computer). In these embodiments, upon receiving user identification data which logs the user into the player tracking system, the one or more servers of the player tracking system communicate user identification data to one or more advertisement tracking servers which log the user into the advertisement tracking account associated with the user. As such, in these embodiments, the system utilizes the logging in of a user to a player tracking account of a player tracking system as a gateway to log the user into an advertisement tracking account.

In certain embodiments wherein the user earns advertising loyalty points for viewing advertisements from a device associated with a gaming establishment and system includes or is otherwise in communication with a gaming establishment player tracking system of a gaming establishment customer management system, the user identification occurs in association with a user logging into the player tracking system from a gaming establishment device, such as an EGM. In these embodiments, upon receiving user identification data which logs the user into the player tracking system, the one or more servers of the player tracking system communicate user identification data to one or more advertisement tracking servers which log the user into the advertisement tracking account associated with the user.

In certain embodiments wherein the user earns advertising loyalty points for viewing advertisements remote from an EGM of a gaming establishment and the system is separate from and not in communication with a gaming establishment player tracking system, the user identification occurs in association with a user logging into the advertisement tracking from a device remote from an EGM of a gaming establishment and the device communicating user identification data to one or more advertisement tracking servers which log the user into the advertisement tracking account associated with the user. As such, in these embodiments, the system enables a user to directly log into an advertisement tracking account.

In certain other embodiments wherein the user earns advertising loyalty points for viewing advertisements from a device associated with a gaming establishment and the system is separate from and not in communication with a gaming establishment player tracking system, the user identification occurs in association with a user logging into the advertisement tracking from a gaming establishment device, such as an EGM, and the EGM communicating user identification data to one or more advertisement tracking servers which log the user into the advertisement tracking account associated with the user.

It should be appreciated that while, in certain embodiments, the user may earn advertising loyalty points for viewing advertisements from a device that is remote from an EGM of a gaming establishment (e.g., a personal device) and while, in certain embodiments, the user may additionally or alternatively earn advertising loyalty points for viewing advertisements from a device associated with a gaming establishment (e.g., an EGM), for brevity and unless specifically stated otherwise, such devices which enable a user to consume advertisements will be referred to herein as "advertisement viewing devices". In these embodiments, the user logs into an advertisement tracking account via one or more of: the user presenting an advertisement tracking identification card (that has an encoded user identification number that uniquely identifies the user) to an advertisement viewing device, such as a user inserting the advertisement tracking identification card to a card reader of an advertisement viewing device, the user presenting a player tracking card that functions as an advertisement tracking identification card (that has an encoded user identification number that uniquely identifies the user) to an advertisement viewing device, such as a user inserting the player tracking card to a card reader of an advertisement viewing device, a user accessing a website, such as a gaming website or a non-gaming website, via an Internet browser of the advertisement viewing device and identifying themselves to one or more servers, such as by inputting the user's unique username and password combination, a user launching an application installed on the advertisement viewing device and identifying themselves to one or more servers, such as by inputting the user's unique username and password combination, an establishment of a wireless communication link between an advertisement viewing device and a mobile device executing an application associated with an identified user; the utilization of any suitable biometric technology or ticket technology to identify a user associated with an advertisement tracking account.

Following the user logging into the advertisement tracking account associated with the user (and assuming the user has not opted out of viewing advertisements), upon an occurrence of an advertising display event, the system causes the advertisement viewing device to display an advertisement as indicated in block 104. For example, upon an occurrence of an advertising display event, one or more servers of the advertisement tracking determine content to be displayed as an advertisement and send the determined content to the advertisement viewing device which displays the determined content.

Figure 2A:
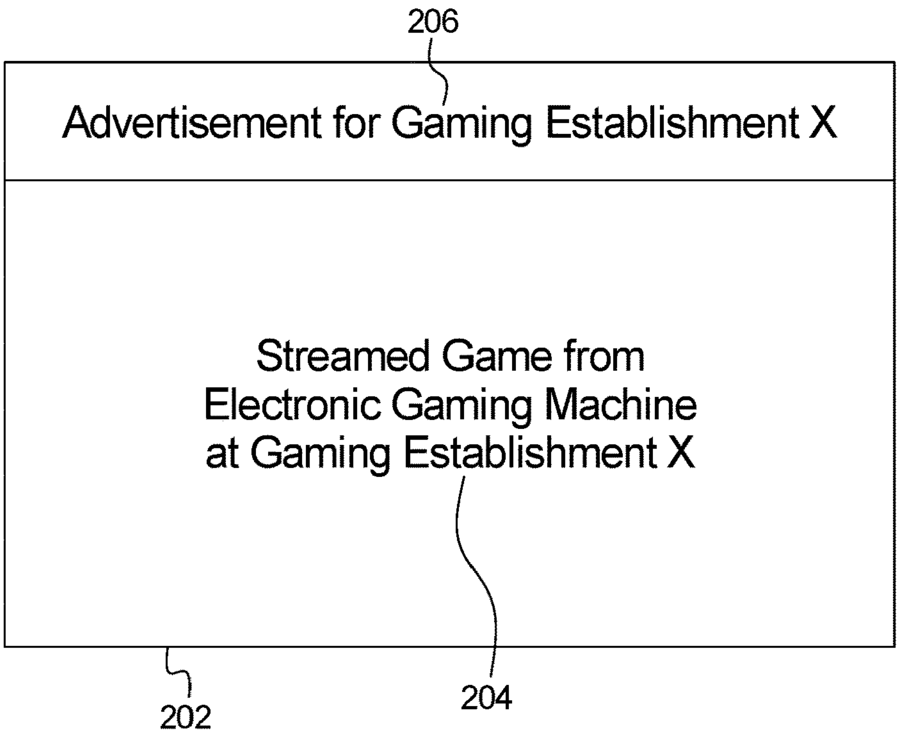
FIG. 2A is an example graphical user interface displayed to a user in association with viewing advertisements.

In certain embodiments, the advertisement tracking server encodes the advertisement within the video otherwise being displayed by the advertisement viewing device. For example, as seen in FIG. 2A, if the user is watching a stream of a game being played by another player at an EGM in a gaming establishment via the advertisement viewing device 202, the advertisement viewing device displays the streamed game 204 and an advertisement or logo 206 associated with the gaming establishment wherein the EGM being played is located at. In another example, the advertisement includes an embedded audio/video clip, such as a promotional audio/video clip of an upcoming event at a gaming establishment along with advertising text describing how to obtain tickets. In certain embodiments, the advertisement tracking server utilizes a picture-in-picture format in causing the advertisement viewing device to display the advertisement. In certain embodiments, the advertisement tracking server utilizes one or more video integration systems to cause the advertisement viewing device to display integrated content including the advertisement and the content otherwise being viewed by the user on the advertisement viewing device. In certain embodiments, the advertisement tracking server causes the advertisement viewing device to display the advertisement before, during and/or after the content otherwise being viewed by the user on the advertisement viewing device.

In certain embodiments, the displayed advertisement includes one or more content components in one or more media formats. In these embodiments, such content components include one or more of: still images (e.g., a logo or name of a sponsor), video clips (e.g., a video recording illustrating a good and/or service offered by a sponsor), sound clips, augmented still images, augmented video clips, augmented sound clips, audio-video clips, text (e.g., an advertisement promoting an upcoming event at a gaming establishment), wagering transaction information (if the advertisement is displayed in association with any wagering game), location information, application usage information, event attendance information, and/or biometric information. In certain embodiments, different content components of the advertisement are combinable with contextual information, such as information about the person, place and time, and then formatted to generate the advertisement.

In certain embodiments, the displayed advertisement is associated with one or more aspects of a gaming establishment, such as advertisements for the gaming establishment itself, one or more venues associated with the gaming establishment (e.g., restaurants within the gaming establishment), and/or one or more events offered at the gaming establishment (e.g., an upcoming tournament at the gaming establishment). In certain embodiments, the displayed advertisement is associated with one or more third-parties associated with a gaming establishment, such as advertisements for a manufacturer of an EGM located within a gaming establishment or advertisements promoting responsible gaming guidelines. In certain other embodiments, the displayed advertisement is associated with one or more third-parties independent of the gaming establishment, such as sponsors wishing to advertise their brands, goods and/or services. It should be appreciated that the system determines which advertisements to display in association with any suitable form or format of online advertising, such as, but not limited to, utilizing one or more integrated internet advertisement engines, and/or an advertisement auction system to determine which advertisements to display and when.

In certain embodiments, the advertiser associated with the displayed advertisement contributes an amount of funds to an advertisement pool in exchange for one or more of advertisements being displayed. In certain such embodiments, different advertisements are associated with different costs to the advertiser wherein factors such as the length of the advertisement, the placement of the advertisements, the format of the advertisement, the day/time when the advertisement is displayed at least partially determine the cost associated with a particular advertisement. In these embodiments, the system utilizes the amount of funds contributed to the advertisement pool to fund one or more benefits provided to one or more users whom have achieved one or more advertising loyalty point levels as described below.

In addition to causing the advertisement viewing device to display one or more advertisements upon an occurrence of an advertising display event, the system determines if an advertising loyalty point accumulation event occurred in association with the advertisement viewing device displaying the advertisement as indicated in diamond 106 of FIG. 1A. In these embodiments, in addition to displaying one or more advertisements to a user, the system tracks such displayed advertisements as they pertain to whether or not any advertising loyalty points should be accumulated for the identified user.

In certain embodiments, the system determines if an advertising loyalty point accumulation event occurred in association with a displayed advertisement based on a quantity of advertisements displayed to the user. In these embodiments, the system tracks the quantity of advertisements displayed to the user and upon determining that the tracked quantity of advertisements displayed to the user at least reaches a threshold quantity, the system causes an advertising loyalty point accumulation event to occur. In certain such embodiments, the threshold quantity is one advertisement such that each time an advertisement is displayed to a user, an advertising loyalty point accumulation event occurs. In certain other embodiments, the threshold quantity is more than one advertisement such that each time an advertisement is displayed to a user, an advertising loyalty point accumulation event may or may not occur.

In certain embodiments, the system determines if an advertising loyalty point accumulation event occurred in association with a displayed advertisement based on an amount of time one or more advertisements are displayed to the user. In these embodiments, the system tracks the amount of time that advertisements are displayed to the user and upon determining that the tracked amount of time at least reaches a threshold amount of time, the system causes an advertising loyalty point accumulation event to occur.

In certain embodiments, the system determines if an advertising loyalty point accumulation event occurred based on one or more characteristics of the displayed advertisement. In these embodiments, different advertisements are associated with different characteristics that may or may not cause an advertising loyalty point accumulation event to occur. For example, a first displayed advertisement associated with a first advertised product is not associated with an occurrence of an advertising loyalty point accumulation event while a second displayed advertisement associated with a second, different advertised product is associated with an occurrence of an advertising loyalty point accumulation event. In another example, a first displayed advertisement of a first length of time is not associated with an occurrence of an advertising loyalty point accumulation event while a second displayed advertisement of a second, different length of time is associated with an occurrence of an advertising loyalty point accumulation event. In another example, a first advertisement displayed in a first format, such as a still image advertisement, is not associated with an occurrence of an advertising loyalty point accumulation event while a second advertisement displayed in a second, different format, such as a video advertisement, is associated with an occurrence of an advertising loyalty point accumulation event.

In certain embodiments, the system determines if an advertising loyalty point accumulation event occurred based on one or more characteristics of a user which the advertisement is displayed to. In these embodiments, different users and/or different user activities are associated with different characteristics wherein the same displayed advertisement and/or number of displayed advertisements displayed to different users may or may not cause an advertising loyalty point accumulation event to occur. For example, an advertisement displayed to a first user of a first advertising loyalty level is not associated with an occurrence of an advertising loyalty point accumulation event while the same advertisement displayed to a second user of a second, different advertising loyalty level is associated with an occurrence of an advertising loyalty point accumulation event. In another example, an advertisement displayed to a user in association with that user wagering a first amount of funds on one or more plays of one or more online games is not associated with an occurrence of an advertising loyalty point accumulation event while the same advertisement displayed to a user in association with that user wagering a second, different amount of funds on one or more plays of one or more online games is associated with an occurrence of an advertising loyalty point accumulation event.

It should be appreciated that in certain embodiments, the system employs one or more measures to monitor if the user displayed the advertisement is or is not viewing the displayed advertisement. In one such embodiment, during and/or following the display of the advertisement, the system prompts the user to make one or more inputs, via an input device of the advertisement viewing device, to confirm they watched the displayed advertisement and/or answer one or more questions relating to the displayed advertisement. In another such embodiment, during the display of the advertisement, the system additionally or alternatively utilizes an eye gaze data capture device, such as one or more eye gaze data capture cameras that monitor a user's eye gaze, to determine where the user is looking at to at least partially determine if the user watched the displayed advertisement. In another such embodiment, during the display of the advertisement, the system additionally or alternatively utilizes one or more sensors to determine if the user is in proximity to the advertisement viewing device to determine whether the user may hear any audio portion of the advertisement. In these embodiments, if the system determines that the user is not watching/listening to the advertisement, the system designates the advertisement as an ineligible advertisement that cannot be associated with the accumulation of any advertising loyalty points.

If the system determines that the advertising loyalty point accumulation event did not occur, the system returns to block 104 of FIG. 1A and awaits another occurrence of an advertising display event. In other words, even if no advertising loyalty point accumulation event occurred in association with one displayed advertisement, the system provides the user another opportunity for an advertising loyalty point accumulation event to occur in association with another displayed advertisement.

On the other hand, if the system determines that an advertising loyalty point accumulation event occurred, the system determines a quantity of advertising loyalty points in association with the occurrence of the advertising loyalty point accumulation event as indicated in block 108. Put differently, if the display of the advertisement via the advertisement viewing device warranted an accumulation of one or more advertising loyalty points, the system determines a number of advertising loyalty points to accumulate.

In certain embodiments, the system determines a quantity of advertising loyalty points based on a quantity of advertisements displayed to the user. In certain other embodiments, the system additionally or alternatively determines a quantity of advertising loyalty points based on an amount of time one or more advertisements are displayed to the user. In certain other embodiments, the system additionally or alternatively determines a quantity of advertising loyalty points based on one or more characteristics of the displayed advertisement. In certain other embodiments, the system additionally or alternatively determines a quantity of advertising loyalty points based on one or more characteristics of the user whom the advertisement was displayed to.

Figure 2B:
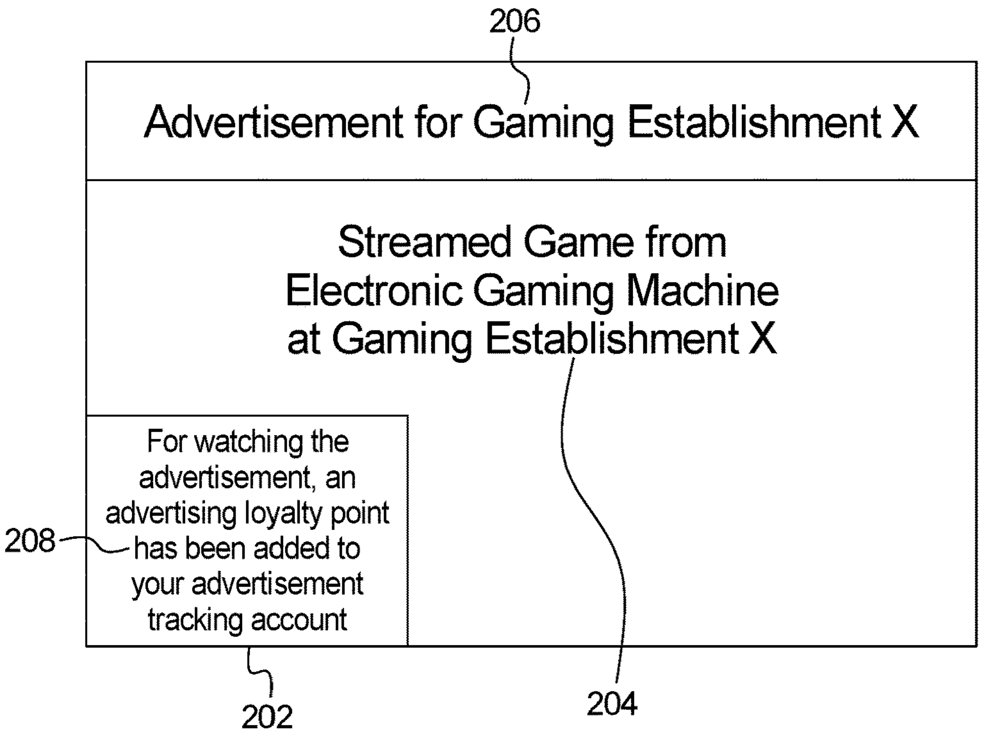
FIG. 2B is an example graphical user interface displayed to a user in association with accumulating advertising loyalty points for viewing advertisements.

Following the determination of a quantity of advertising loyalty points associated with the occurrence of advertising loyalty point accumulation event, the system accumulates the determined quantity of advertising loyalty points in association with the advertisement tracking account associated with the user as indicated in block 110 of FIG. 1A. In these embodiments, as a reward for viewing one or more advertisements, the system of the present disclosure accumulates one or more advertising loyalty points in an account associated with the user. For example, as seen in FIG. 2B after a user at an advertisement viewing device 202 viewed a threshold quantity of advertisements 206 in association with viewing a stream of a game being played at an EGM 204, the system determines that an advertising loyalty point accumulation event occurred based on such displayed advertisements and credited the advertisement tracking account associated with the user with an advertising loyalty point 208.

Following the accumulation of the determined quantity of advertising loyalty points in association with the advertisement tracking account associated with the user, the system returns to block 104 and awaits another occurrence of an advertising display event. In other words, following an occurrence of an advertising loyalty point accumulation event and the subsequent accumulation of one or more advertising loyalty points, the system provides the user additional opportunities for additional advertising loyalty point accumulation events to occur in association with another displayed advertisement.

In addition to accumulating zero, one or more advertising loyalty points in association with viewing advertisements via an advertisement viewing device, the system of the present disclosure further enables the user to utilize any accumulated advertising loyalty points in association with the user's gaming experience. That is, upon the user engaging one or more EGMs at a gaming establishment, the system utilizes the previously accumulated advertising loyalty points to influence the user's interactions with such EGMs.

In certain embodiments, similar to the above-described scenario of a user logging into the advertisement tracking account to accumulate advertising loyalty points in exchange for viewing advertisements while remote from an EGM at a gaming establishment, upon an occurrence of a user identification event at an EGM, as indicated by block 152 of FIG. 1B, the system enables a user to log into an advertisement tracking account associated with the user. By logging into the same advertisement tracking account which any previously accumulated advertising loyalty points are associated with, the system enables the user to utilize any earned advertising loyalty points as part of their gaming establishment experience.

In certain embodiments, the user identification occurs in association with a user logging into a player tracking system from the EGM wherein the EGM communicates user identification data to a player tracking system which logs the user into a player tracking account associated with the user. In these embodiments, upon receiving the user identification data, one or more servers of the player tracking system communicate user identification data to one or more advertisement tracking servers which also logs the user into the advertisement tracking account associated with the user. In certain other embodiments, the user identification occurs in association with a user logging into the advertisement tracking directly from the EGM separate from the user logging into a player tracking system. In these embodiments, the EGM communicates user identification data to one or more advertisement tracking servers which log the user into the advertisement tracking account associated with the user. In various embodiments, the user logs into an advertisement tracking account from an EGM via one or more of: the user presenting an advertisement tracking identification card (that has an encoded user identification number that uniquely identifies the user) to the EGM, such as a user inserting the advertisement tracking identification card to a card reader of the EGM, the user presenting a player tracking card that functions as an advertisement tracking identification card (that has an encoded player identification number that uniquely identifies the user) to an EGM, such as a user inserting the player tracking card to a card reader of an EGM, an establishment of a wireless communication link between an EGM and a mobile device executing an application associated with an identified user; the utilization of any suitable biometric technology or ticket technology to identify a user associated with an advertisement tracking account.

It should be appreciated that the term "EGM" is used herein to refer to any suitable electronic gaming machine which enables a player place one or more wagers on one or more games of chance, games of skill and/or sporting event outcomes, play one or more games of chance or games of skill, and/or view one or more sporting events and/or advertisements wherein the EGM comprises, but is not limited to: a slot machine, a video poker machine, a video lottery terminal, a terminal associated with an electronic table game, a video keno machine, a video bingo machine, or a sports betting terminal. It should be further appreciated that while described herein in certain embodiments as an EGM interacting with one or more advertisement tracking servers to access an advertisement tracking account associated with a user, in certain embodiments, a component of a gaming establishment management system, such as a slot machine interface board, in communication with the EGM interacts with the advertisement tracking server (and the EGM) to facilitate the system of the present disclosure. As such, any suitable action, function or interaction performed by or otherwise associated with an EGM (in association with the EGM interacting with the advertisement tracking server of the present disclosure) may additionally or alternatively be performed by or otherwise associated with another component of the gaming system, such as a slot machine interface board or other component of a gaming establishment management system either operating in combination with the EGM or operating independent of the EGM.

In certain embodiments, in association with identifying the user whom has previously viewed zero, one or more advertisements associated with zero, one or more advertisers, the system enables the advertisers to interact with the user when at the gaming establishment. For example, following the system determining that the quantity of advertisements for a product and/or service displayed to the user exceeded a threshold quantity, subject to advertiser approval, the system causes one or more coupons or vouchers associated with the advertised product and/or service to be made available to the user, such as being printed by a printer of an EGM or accessible by an application of a mobile device of the user.

Following the user logging into the advertisement tracking account associated with the user from an EGM, as indicated in block 154 of FIG. 1B, the system determines, based on the quantity of advertising loyalty points associated with the user's advertisement tracking account, an advertising loyalty point level associated with the user. In these embodiments, different quantities of accumulated advertising loyalty points are associated with different advertising loyalty point levels (which are associated with different benefits as described below). For example, under one-hundred accumulated advertising loyalty points (which correspond to under one-hundred advertisements viewed) is associated with a silver advertising loyalty point level, between one-hundred and five-hundred accumulated advertising loyalty points (which correspond to between one-hundred and five-hundred advertisements viewed) is associated with a gold advertising loyalty point level, and over five-hundred accumulated advertising loyalty points (which correspond to over five-hundred advertisements viewed) is associated with a platinum advertising loyalty point level.

Following the determination of an advertising loyalty point level associated with the user, the system determines if an advertising loyalty point benefit realization event occurred as indicated in diamond 156 of FIG. 1B. In these embodiments, in addition to determining an advertising loyalty point level based on one or more advertisement viewing activities, such as viewing advertisements remote from the EGM, the system determines whether or not any triggering event occurs at or in association with the EGM (or the user) to cause a benefit to be realized in association with the advertisement viewing activities.

In certain embodiments, an advertising loyalty point benefit realization event occurs based on upon a determination that an identified user is associated with an advertisement tracking account. In certain embodiments, an advertising loyalty point benefit realization event occurs based on upon a determination that an identified user is associated with an advertisement tracking account of at least a designated advertising loyalty point level. In certain embodiments, an advertising loyalty point benefit realization event occurs based on an event displayed during a play of a game at the EGM. In certain embodiments, an advertising loyalty point benefit realization event occurs based on an event that is independent of any event displayed in association with a game played at the EGM. In certain embodiments, an advertising loyalty point benefit realization event occurs based on one or more inputs made by the user and/or gaming establishment personnel, such as an input made to redeem a quantity of advertising loyalty points in exchange for an occurrence of an advertising loyalty point benefit realization event.

If the system determines that an advertising loyalty point benefit realization event occurred, the system determines one or more benefits in association with the advertising loyalty point level associated with the user and causes the determined benefits to be provided to the user as indicated in blocks 158 and 160. That is, upon a determination that providing one or more benefits to the user is warranted, the system determines the scope of such benefits based on the determined advertising loyalty point level associated with the user (which is determined based on the user's activities viewing one or more advertisements) and makes such benefits available to the user.

In certain embodiments, as mentioned above, the system contributes part or all of the fees paid by the sponsors associated with the viewed advertisements to a pool, such as a benefit amount pool. In these embodiments, the system utilizes the amount of funds accumulated in the benefit amount pool to fund the benefits provided to the user in association with the occurrence of the advertising loyalty point benefit realization event. In certain other embodiments, the funding of the benefits provided in association with the occurrence of the advertising loyalty point benefit realization event occurs based on other funding avenues, such as based on a portion of wagers placed and/or gaming establishment marketing funds.

In certain embodiments, the determined benefit includes one or more free (or reduced cost) plays of one or more games of chance (or games of skill). In one such embodiment, a quantity of plays of the game of chance (or game of skill) is based on the advertising loyalty point level associated with the user, wherein different advertising loyalty point levels are associated with different quantities of plays of the game of chance (or game of skill). In another such embodiment, a quantity of plays of the game of chance (or game of skill) is additionally or alternatively based on an identification of the user, such as based on a player tracking status of the user and/or a frequency which the user transacts with the gaming establishment, wherein different users are associated with different quantities of plays of the game of chance (or game of skill). In these embodiments, such games of chance (or games of skill) include, but are not limited to: a play of any suitable slot game; a play of any suitable wheel game; a play of any suitable card game (including any suitable type of poker game, such as, but not limited to, a multiple hand poker game, Texas Hold'em, Omaha, Three Card Poker, Four Card Poker, Seven Card Stud, Pai Gow Poker, Caribbean Stud Poker, or Let It Ride Poker, as well as other suitable non-poker interactive cards games, such as, but not limited to, blackjack, Baccarat, Spanish 21, Casino War, Super Fun 21, or Vegas Three Card Rummy), a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window of an EGM; a play of any suitable game on a mobile device; and/or a play of any suitable game of the present disclosure.

In certain embodiments, the determined benefit includes one or more free (or reduced cost) wagers placed, such as one or more free (or reduced cost) sporting event wagers placed. In one such embodiment, an amount of the sporting event wager placed is based on the advertising loyalty point level associated with the user, wherein different advertising loyalty point levels are associated with different amounts of the sporting event wager placed. In another such embodiment, an amount of the sporting event wager placed is additionally or alternatively based on an identification of the user, such as based on a player tracking status of the user and/or a frequency which the user transacts with the gaming establishment, wherein different users are associated with different amounts of the sporting event wager placed.

In certain embodiments, the determined benefit includes an entry in a drawing. In one such embodiment, a quantity of entries in the drawing is based on the advertising loyalty point level associated with the user, wherein different advertising loyalty point levels are associated with different quantities of drawing entries. In another such embodiment, a quantity of entries in the drawing is additionally or alternatively based on an identification of the user, such as based on a player tracking status of the user and/or a frequency which the user transacts with the gaming establishment, wherein different users are associated with different quantities of drawing entries.

In certain embodiments, the determined benefit includes one or more features usable in association with one or more plays of a game. That is, the determined benefit is associated with one or more plays of one or more games, such as a modification to one or more game play features and/or an addition of one or more game play features that may or may not modify the average expected payout of such plays of the game, wherein different advertising loyalty point levels are associated with different magnitudes of modification to the one or more features.

Figure 4A:
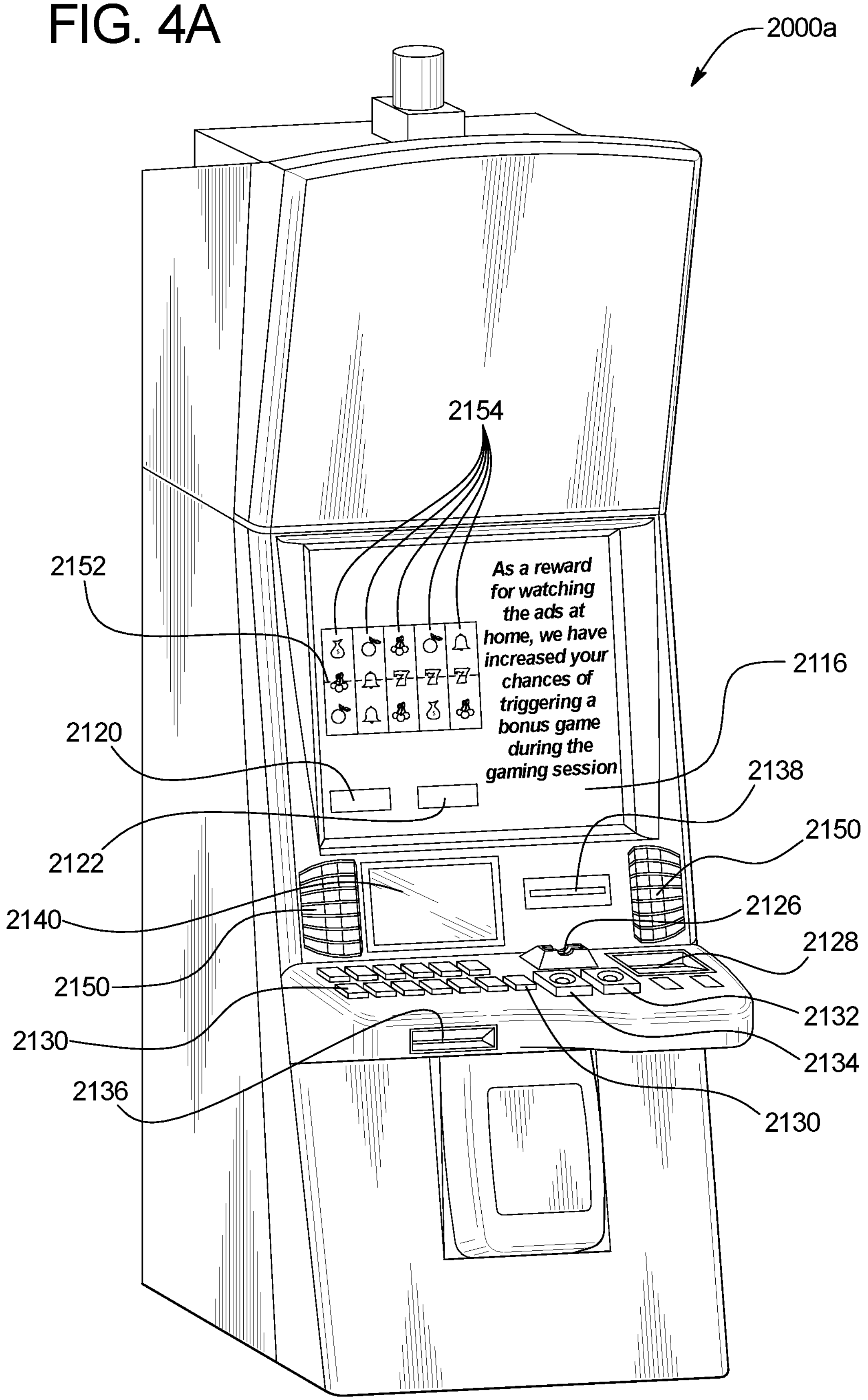
FIGS. 4A and 4B are perspective views of example alternative embodiments of the gaming system of the present disclosure.

For example, the determined benefit includes the utilization of a modified paytable which utilizes a modified probability of triggering a bonus event (or winning a progressive award). In this example, a user associated with a silver advertising loyalty point level is provided the benefit of utilizing a first modified paytable associated with an increase of 0.01% of triggering a bonus event (or winning a progressive award), a user associated with a gold advertising loyalty point level is provided the benefit of utilizing a second modified paytable associated with an increase of 0.02% of triggering a bonus (or winning a progressive award), and a user associated with a platinum advertising loyalty point level is provided the benefit of utilizing a third modified paytable associated with an increase of 0.04% of triggering a bonus event (or winning a progressive award). In this example, as seen in FIG. 4A, upon determining that the identified user qualifies as a gold advertising loyalty point level, the system modifies operation of the EGM and notifies the user of the modification.

Figure 4B:
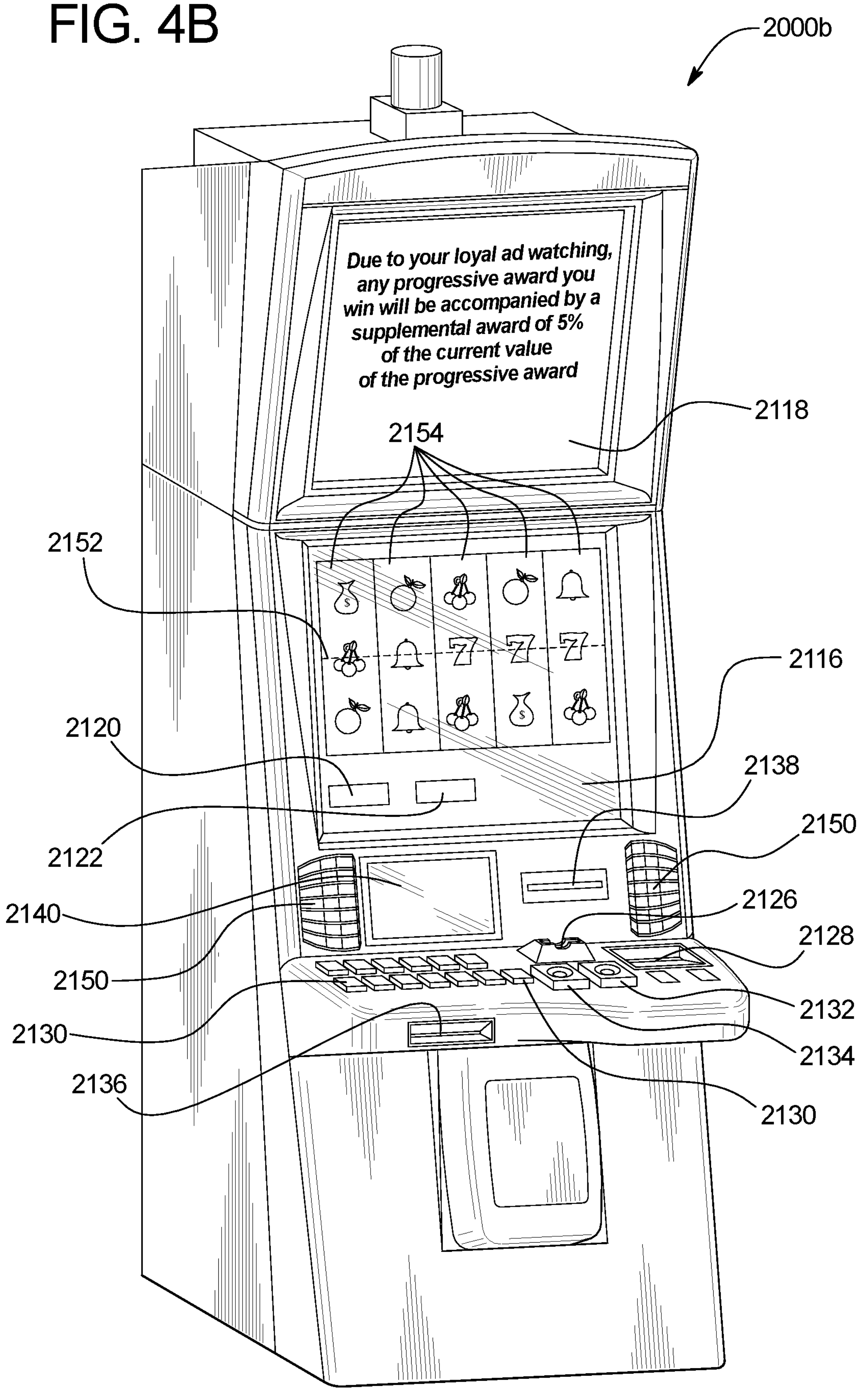

In another example, the determined benefit includes the utilization of a supplemental award provided to the user upon a progressive award triggering event occurring. In this example, upon a progressive award triggering event occurring, a user associated with a silver advertising loyalty point level is provided the benefit of a supplemental award of 1% of the value of the progressive award, a user associated with a gold advertising loyalty point level is provided the benefit of a supplemental award of 2% of the value of the progressive award, and a user associated with a platinum advertising loyalty point level is provided the benefit of a supplemental award of 5% of the value of the progressive award. In this example, as seen in FIG. 4B, upon determining that the identified user qualifies as a platinum advertising loyalty point level, the system notifies the user that if they win a progressive award, they will also win a supplemental award of 5% of the current value of the progressive award.

It should be appreciated that a determined benefit includes any suitable feature which modifies any aspect of any game currently or subsequently played by the user which is associated with the determined benefit, wherein different advertising loyalty point levels are associated with different magnitudes of modification to and/or activation of the one or more features. In various embodiments, one or more features employed as a determined benefit include, but are not limited to: a feature modifying one or more symbols available to be generated for one or more plays of one or more games associated with the provided benefit; a feature modifying one or more wild symbols available to be generated for one or more plays of one or more games associated with the provided benefit; a feature modifying a quantity of reels to be used for one or more plays of one or more games associated with the provided benefit; a feature modifying which of a plurality of reel are to be used for one or more plays of one or more games associated with the provided benefit; a feature modifying a deck of playing cards to be used for one or more plays of one or more games associated with the provided benefit; a feature modifying a quantity of playing cards to be used for one or more plays of one or more games associated with the provided benefit; a feature modifying a quantity of poker hands to be dealt for one or more plays of one or more games associated with the provided benefit; a book-end wild symbols feature; a stacked wild symbols feature; an expanding wild symbols feature; a retrigger symbol feature; an anti-terminator symbol feature; a locking reel feature, a locking symbol position feature; a modifier, such as a multiplier, feature; a feature modifying an amount of credits of a credit balance; a feature modifying an amount of promotional credits; a feature modifying a placed wager amount; a feature modifying a placed side wager amount; a feature modifying a rate of earning player tracking points; a feature modifying a rate of earning promotional credits; a feature modifying a rate of earning virtual credits; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage of a subsequent play of a game; a feature modifying an average expected payout of a subsequent play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying an availability of a secondary game; and/or a feature modifying any game play feature associated with any play of any game of the present disclosure.

It should be appreciated that in these embodiments, since one or more plays of one or more games of chance (or games of skill), one or more wagers placed (such as one or more sporting event wagers placed), one or more activated or modified features, and/or one or more entries into one or more drawings may or may not result in an award for the user, such benefits are opportunities to obtain one or more benefits. That is, while such benefits have an average expected value (i.e., a theoretical value which is based on the awards available and the probability of obtaining any of such awards), since one or more determinations subsequently occur in association with the determined benefit and an actual value of the determined benefit (i.e., the benefit associated with the determined benefit) is based on the results of such determinations (wherein the actual value may be a lucrative value or a value of zero), these determined benefits may be viewed as opportunities to obtain a benefit.

In certain embodiments, the determined benefit includes a static award. In one embodiment, the amount of the static award is based on the advertising loyalty point level associated with the user, wherein different advertising loyalty point levels are associated with different static awards. In another embodiment, the amount of the static award is additionally or alternatively based on an identification of the user, such as based on a player tracking status of the user and/or a frequency which the user transacts with the gaming establishment, wherein different users are associated with different static award amounts.

In certain such embodiments, the determined benefit includes an amount of credits. In certain such embodiments, the determined benefit includes a quantity of player tracking points. In certain embodiments, the determined benefit includes a player tracking point modifier applicable to a quantity of player tracking points subsequently earned by the user. In certain embodiments, the determined benefit additionally or alternatively includes a player tracking point modifier applicable to a quantity of player tracking points previously earned by the user. In certain embodiments, the determined benefit includes a quantity of non-cashable promotional credits usable to fund one or more plays of one or more games of chance. In certain embodiments, the determined benefit includes a quantity of virtual credits usable for a play of a social or non-wagering game.

In certain embodiments, the determined benefit includes a conditional award that the user becomes eligible for based on the satisfaction of one or more criteria. For example, if a user associated with an benefit of a conditional award places a wager on a play of a game at the gaming establishment within a designated period of time after the advertising loyalty point benefit realization event occurs, the system determines that the criteria associated with the conditional award is satisfied and the conditional award vests (i.e., the award becomes available to the user). It should be appreciated that any suitable criteria associated with the gaming establishment, associated with an entity having a relationship with the gaming establishment or independent of the gaming establishment may be utilized to determine whether or not the user satisfies such criteria and thus becomes eligible to receive a benefit associated with the determined benefit.

It should be appreciated that in these embodiments, the static awards have known values and thus represent known benefits. That is, unlike certain benefits, such as an entry into a drawing or a play of a game of chance, which may result in the user obtaining no value or which may result in the user obtaining a positive valued benefit, other benefits, such as a quantity of player tracking points will result in the user obtaining value (upon the satisfaction of zero, one or more conditions) (and thus represent static or known benefits).

Following the providing of the benefit upon the occurrence of the advertising loyalty point benefit realization event or upon a determination that the advertising loyalty point benefit realization event did not occur, the system returns to diamond 156 and monitors for an occurrence of an advertising loyalty point benefit realization event. That is, following making one or more benefits available to a user in association with that user's advertising loyalty point level (which is based, at least in part, on the user's activities viewing one or more advertisements) or upon a determination that no event occurred which would cause a benefit to be realized in association with the advertisement viewing activities of a user, the system continues to monitor for such an event.

Accordingly, the systems and methods of the present disclosure provides a gaming currency in the form of advertising loyalty points which are in addition to and different than certain current known gaming establishment currencies, such as monetary credits, promotional credits and player tracking points. The advertising loyalty points of the present disclosure are accumulated based on a user undertaking certain advertiser related activities. The advertising loyalty points of the present disclosure are further utilized to obtain one or more benefits at an electronic gaming machine ("EGM") wherein different quantities of accumulated advertising loyalty points are associated with different advertising loyalty point levels associated with different benefits, such as different modifications of the EGM. As such and unlike certain gaming currencies which are accumulated based on a player's gaming activities at one or more EGMs, the advertising loyalty points of the present disclosure are accumulated independent of a player's gaming activities at any EGMs, thus freeing the player up from having to remain at a gaming establishment without forcing the player to forgo earning benefits to be subsequently used at the gaming establishment.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device).

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
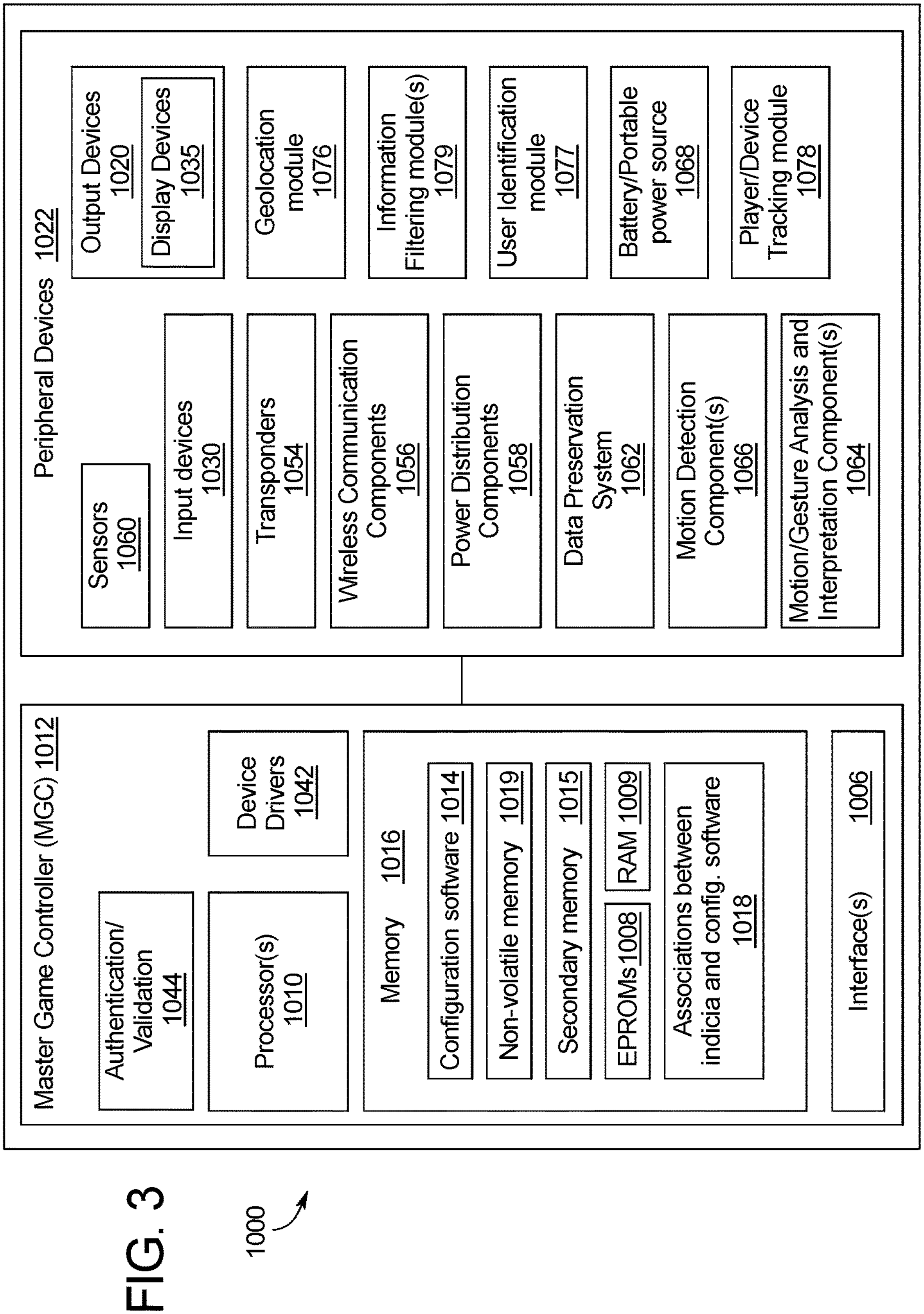
FIG. 3 is a schematic block diagram of one embodiment of an electronic configuration of an example gaming system of the present disclosure.
Figure 4C:
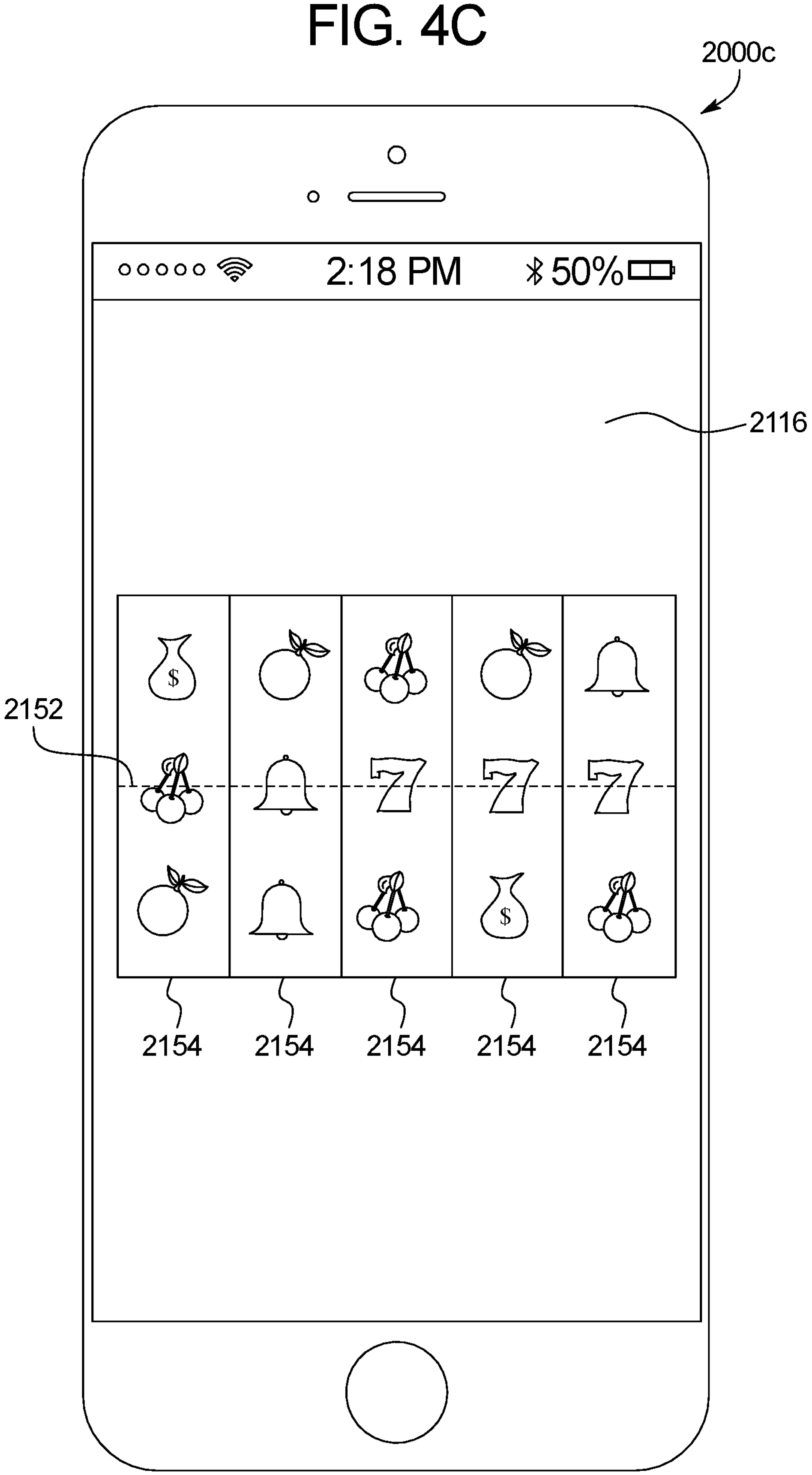
FIG. 4C is a front view of an example personal gaming device of the system of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

In various embodiments, the processes of the present disclosure are represented by a set of instructions stored in one or more memories and executed by one or more processors. Although certain of the processes of the present disclosure are described with reference to one or more flowcharts, many other processes of performing the acts associated with these illustrated processes may be employed. For example, the order of certain of the illustrated blocks or diamonds may be changed, certain of the illustrated blocks or diamonds may be optional, or certain of the illustrated blocks or diamonds may not be employed.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A method of operating a gaming system comprising a display device and a processor, the method comprising:

responsive to an occurrence of a triggering event and an identified user being associated with a first advertising loyalty point level at least partially based on a first quantity of advertisements consumed, prior to a play of a game, remote from the display device and independent of any content generated by the processor, displaying, by the display device, a first operational modification associated with the play of the game, wherein the first quantity of advertisements are consumed after the identified user has logged into an advertisement tracking account maintained by an advertisement tracking server that is distinct from the processor, and responsive to the occurrence of the triggering event and the identified user being associated with a second, different advertising loyalty point level at least partially based on a second quantity of advertisements consumed, prior to the play of the game, remote from the display device and independent of any content generated by the processor, displaying, by the display device, a second, different operational modification associated with the play of the game, wherein the second quantity of advertisements are consumed after the identified user has logged into the advertisement tracking account maintained by the advertisement tracking server.

2. The method of claim 1, wherein the occurrence of the triggering event is based on a redemption, via an input device, of a quantity of advertising loyalty points accumulated in association with the identified user.

3. The method of claim 1, wherein the first operational modification comprises a first increase of an average expected payout of a paytable associated with the play of the game and the second, different operational modification comprises a second, different increase of the average expected payout of the paytable associated with the play of the game.

4. The method of claim 1, wherein the first operational modification comprises a first increase of a probability of triggering a bonus event in association with the play of the game and the second, different operational modification comprises a second, different increase of a probability of triggering the bonus event in association with the play of the game.

5. The method of claim 1, wherein the first quantity of advertisements consumed equals the second quantity of advertisements consumed.

6. A method of operating a gaming system comprising a display device and a processor, the method comprising:

responsive to an occurrence of a triggering event and an advertising loyalty point level associated with an identified user being a first advertising loyalty point level, and a quantity of accumulated advertising loyalty points associated with the identified user being a first quantity of accumulated advertising loyalty points, displaying, by the displaying device, a first benefit, wherein the quantity of accumulated advertising loyalty points associated with the identified user is at least partially based on a first quantity of advertisements consumed, prior to the occurrence of the triggering event and after the identified user has logged into an advertisement tracking account maintained by an advertisement tracking server that is distinct from the processor, remote from the display device and independent of any content generated by the processor, responsive to the advertising loyalty point level associated with the identified user being the first advertising loyalty point level, and the quantity of accumulated advertising loyalty points associated with the identified user being a second, different quantity of accumulated advertising loyalty points, displaying, by the display device, a second, different benefit, and responsive to the advertising loyalty point level associated with the identified user being a second, different advertising loyalty point level, and the quantity of accumulated advertising loyalty points associated with the identified user being the first quantity of accumulated advertising loyalty points, displaying, by the display device, the second, different benefit.

7. The method of claim 6, wherein the triggering event comprises a win of a progressive award, the first benefit comprises a first additional award based on a first percentage of the progressive award and the second benefit comprises a second, different additional award based on a second, different percentage of the progressive award.

8. The method of claim 6, wherein the triggering event comprises an initiation of a sequence including a quantity of plays of a game, the first benefit comprises a first additional quantity of plays of the game of the initiated sequence and the second benefit comprises a second, different additional quantity of plays of the game of the initiated sequence.

9. The method of claim 6, wherein the triggering event comprises a play of a game, the first benefit comprises a first modification of an average expected payout of a paytable associated with the play of the game and the second benefit comprises a second, different modification of the average expected payout of the paytable associated with the play of the game.

10. The method of claim 6, wherein the quantity of accumulated advertising loyalty points is distinct from any credits, distinct from any promotional credits, and distinct from any player tracking points.

11. The method of claim 6, wherein after the occurrence of the triggering event, displaying, by the display device, a reduction of the quantity of accumulated advertising loyalty points associated with the identified user.

12. The method of claim 6, wherein the first quantity of advertisements consumed equals the second quantity of advertisements consumed.

* * * * *